US007894829B2

(12) United States Patent
Kim

(10) Patent No.: US 7,894,829 B2
(45) Date of Patent: Feb. 22, 2011

(54) WIRELESS COMMUNICATION TERMINAL AND METHOD FOR CHECKING WIRELESS BROADBAND INTERNET SERVICE AREA USING POSITION DETECTION SYSTEM

(75) Inventor: Hyung-Woo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 871 days.

(21) Appl. No.: 11/713,076

(22) Filed: Mar. 1, 2007

(65) Prior Publication Data

US 2008/0064411 A1 Mar. 13, 2008

(30) Foreign Application Priority Data

Sep. 8, 2006 (KR) ............... 10-2006-0087070

(51) Int. Cl.
*H04W 24/00* (2009.01)
(52) U.S. Cl. ............ 455/456.3; 455/456.1; 340/988; 340/990
(58) Field of Classification Search ........... 455/456.1, 455/456.2, 456.3, 456.4, 456.5, 456.6, 404.2, 455/452.2, 432.3, 552.2, 553; 701/201, 202, 701/203; 340/988, 989, 990, 995.12, 995.17
See application file for complete search history.

(56) References Cited

U.S. PATENT DOCUMENTS

| 7,149,530 | B1 * | 12/2006 | Arakawa et al. ......... 455/456.1 |
| 2002/0026289 | A1 * | 2/2002 | Kuzunuki et al. ........... 702/150 |
| 2004/0044911 | A1 * | 3/2004 | Takada et al. ............... 713/201 |
| 2004/0152472 | A1 * | 8/2004 | Ono et al. ................. 455/456.1 |
| 2004/0170141 | A1 * | 9/2004 | He et al. ..................... 370/335 |
| 2004/0193365 | A1 * | 9/2004 | Kokojima et al. ........... 701/201 |
| 2004/0214616 | A1 | 10/2004 | Malcolm |
| 2005/0101326 | A1 * | 5/2005 | Kang et al. ................. 455/436 |
| 2005/0159171 | A1 * | 7/2005 | Kaneko .................... 455/456.1 |
| 2006/0019679 | A1 * | 1/2006 | Rappaport et al. ........ 455/456.5 |
| 2006/0025151 | A1 * | 2/2006 | Karaoguz et al. ............ 455/455 |
| 2006/0154663 | A1 * | 7/2006 | Son et al. ................. 455/435.1 |
| 2006/0233198 | A1 * | 10/2006 | Kim et al. .................... 370/469 |
| 2006/0234742 | A1 * | 10/2006 | Kim et al. .................... 455/513 |

(Continued)

FOREIGN PATENT DOCUMENTS

CN 1353525 6/2002

(Continued)

*Primary Examiner*—Jean A Gelin
(74) *Attorney, Agent, or Firm*—The Farrell Law Firm, P.C.

(57) ABSTRACT

A wireless mobile communication terminal and method that can check a service area using GPS are provided. The wireless communication terminal using a position detection system and a wireless communication system having at least one connection node for providing a network connection service to a plurality of wireless communication terminals includes a communication module, a position detection module, and a network connection module which includes a service map specifying the availability of communication in an area determined according to a state of radio waves that have arrived from the connection node. The network connection module manages network connection using the position information about the wireless communication terminal and the service map. Therefore, the wireless communication terminal can determine if its current position is in an available WiBro service area using the GPS and WiBro service map information, thereby preventing power consumption due to unnecessary connection attempt in the unavailable service area.

10 Claims, 4 Drawing Sheets

U.S. PATENT DOCUMENTS

| | | | |
|---|---|---|---|
| 2006/0246887 A1* | 11/2006 | Barclay et al. | 455/423 |
| 2006/0276189 A1* | 12/2006 | Kiernan et al. | 455/436 |
| 2007/0096582 A1* | 5/2007 | Kageyama et al. | 310/204 |
| 2007/0160017 A1* | 7/2007 | Meier et al. | 370/338 |
| 2008/0009324 A1* | 1/2008 | Patel | 455/566 |

FOREIGN PATENT DOCUMENTS

| | | |
|---|---|---|
| CN | 1645768 | 7/2005 |
| JP | 2001/320776 | 11/2001 |
| JP | 2002/191075 | 7/2002 |
| KR | 1020060039553 | 5/2006 |
| KR | 1020070042039 | 4/2007 |
| WO | WO 98/58507 | 12/1998 |
| WO | WO 02/35874 | 5/2002 |
| WO | WO 03/056870 | 7/2003 |
| WO | WO 2004/052041 | 6/2004 |
| WO | WO 2004/110073 | 12/2004 |

\* cited by examiner

WIRELESS COMMUNICATION TERMINAL AND METHOD FOR CHECKING WIRELESS BROADBAND INTERNET SERVICE AREA USING POSITION DETECTION SYSTEM

PRIORITY

This application claims priority to an application entitled "WIRELESS COMMUNICATION TERMINAL AND METHOD FOR CHECKING WIRELESS BROADBAND INTERNET SERVICE AREA USING POSITION DETECTION SYSTEM" filed in the Korean Intellectual Property Office on Sep. 8, 2006 and assigned Ser. No. 2006-87070, the contents of which are incorporated herein by reference.

BACKGROUND OF THE INVENTION

1. Field of the Invention

The present invention relates to wireless mobile communication, and more particularly, to a wireless mobile communication terminal and method that can check a service area using a Global Positioning System (GPS).

2. Description of the Related Art

Wireless Broadband (WiBro) is a broadband wireless Internet technology that supports super high-speed Internet service even when a terminal is in a moving state as well as a stationary state. WiBro has a transmission speed of about 1 Mbps and extends super high-speed Internet service from an indoor wired system to a wireless mobile environment outdoors.

WiBro operates in a frequency band of 2.3 GHz and has a cell radius of about 1 Km WiBro provides a seamless wireless Internet service at a moving speed of at least 60 Km/H, supports a high transmission speed, and provides cheaper Internet service than other services.

When a WiBro wireless communication terminal enters a WiBro network, the wireless communication terminal performs up-link synchronization and transmission power adjustment through code ranging. If the code ranging is successively performed, a segment enabling transmission of a ranging request (RNG_REQ) message from a Radio Access Station (RAS) area is allocated to the wireless communication terminal and the wireless communication terminal performs network connection through a ranging request/response (RNG_REQ/RSP) message exchange. The wireless communication terminal is allocated with a basic connection identifier (Basic CID) and a primary management connection identifier (Primary Management CID) through the RNG_REQ/RSP message exchange. The CIDs are values inherently allocated to the wireless communication terminal and become information that identifies the wireless communication terminal during connection between the RAS and the wireless communication terminal. The wireless communication terminal performs authentication, registration, and negotiation using the values. In a state where the wireless communication terminal is connected to the RAS, if the wireless communication terminal moves from a service area of the corresponding RAS to a service area of another RAS, handoff occurs so as to keep the service.

However, in a conventional WiBro wireless communication terminal, if the wireless communication terminal fails to range, the ranging process is repeatedly performed. Particularly, when the wireless communication terminal deviates from a WiBro service area, the wireless communication terminal continues repeated attempts to range, whereby power consumption rapidly increases and thus the battery abruptly runs out of power.

Further, in the conventional WiBro wireless communication terminal, although the wireless communication terminal succeeds in ranging, when the wireless communication terminal is positioned at an edge of a service area or attempts to connect in an area where intensity of a signal is weak, the wireless communication terminal has a high probability of failing to perform subsequent authentication, registration, and IP assignment processes.

Further, a weak radio area may exist even within a WiBro service area. If the wireless communication terminal moves to the weak radio area, the existing WiBro connection is disconnected and a new connection is continuously attempted, whereby power is unnecessarily consumed.

SUMMARY OF THE INVENTION

The present invention has been made in an effort to solve the above problems, and an object of the present invention is to provide a wireless mobile communication terminal and method that can reduce unnecessary power consumption by providing information such as area specific availability of WiBro service and the existence of a weak radio area within the WiBro service area to a wireless communication terminal using GPS.

Another object of the present invention is to provide a wireless mobile communication terminal and method that can prevent power consumption due to unnecessary attempts to connect to a WiBro network by providing area specific availability of WiBro service to the wireless communication terminal in a state where a WiBro modem is turned off.

In accordance with an aspect of the present invention, the above and other objects are accomplished by a wireless communication terminal using a position detection system and a wireless communication system having at least one connection node for providing a network connection service to a plurality of wireless communication terminals. The wireless communication terminal includes a communication module for communicating with other wireless communication terminals; a position detection module for receiving position information about the wireless communication terminal; a network connection module, including an area availability service map specifying an available service area determined according to a state of radio waves that have arrived from the connection node, for managing network connection using the position information of the wireless communication terminal and the service map.

Preferably, the communication standard is IEEE 802.16; the position detection system is GPS and, the service map includes information about position and range of an available area, an unavailable area, and a weak radio area.

Preferably, the service map is updated based on position information received from the position detection system and a network connection attempt result.

In accordance with another aspect of the present invention, the above and other objects are accomplished by a wireless communication terminal using a position detection system and a wireless communication system having at least one connection node for providing a network connection service to a plurality of wireless communication terminals. The method includes receiving position information about the wireless communication terminal through a separate channel; determining if a signal for a connection request to the connection node is applied; and attempting, if the signal for a connection request is applied, to connect to the network using the position information and the service map specifying the previously stored communication availability service area.

Preferably, the position information is received through GPS; and the service map includes information about a position and a range of a communication possible area, a communication impossible area, and a weak radio area.

Preferably, attempting to connect to a network includes determining if a current position is in an available service area; and if the current position is in an unavailable service area, outputting a message informing that the current position is in an unavailable service area.

Preferably, attempting to connect to a network further includes determining if a signal for a connection request is re-applied after outputting the message informing that the current position is in an unavailable service area; and turning on a communication modem and attempting to connect to a network if a signal for a connection request is re-applied.

Preferably, attempting to connect to a network further includes turning on a communication modem and attempting to connect to a network if a current position is in an available service area.

Preferably, attempting to connect to a network further includes determining if the connection is successful and if so performing communication; determining if a signal for a connection release request is applied while the communication is performed; and releasing the connection and turning off a communication modem if a signal for a connection release request is applied; and updating the service map based on the position information and the connection failure result if the connection is unsuccessful.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments are shown in drawings and are described herein in detail with the understanding that the present disclosure is to be considered as an exemplification of the principles of the invention and is not intended to limit the invention to the specific embodiments illustrated.

Figure 1:
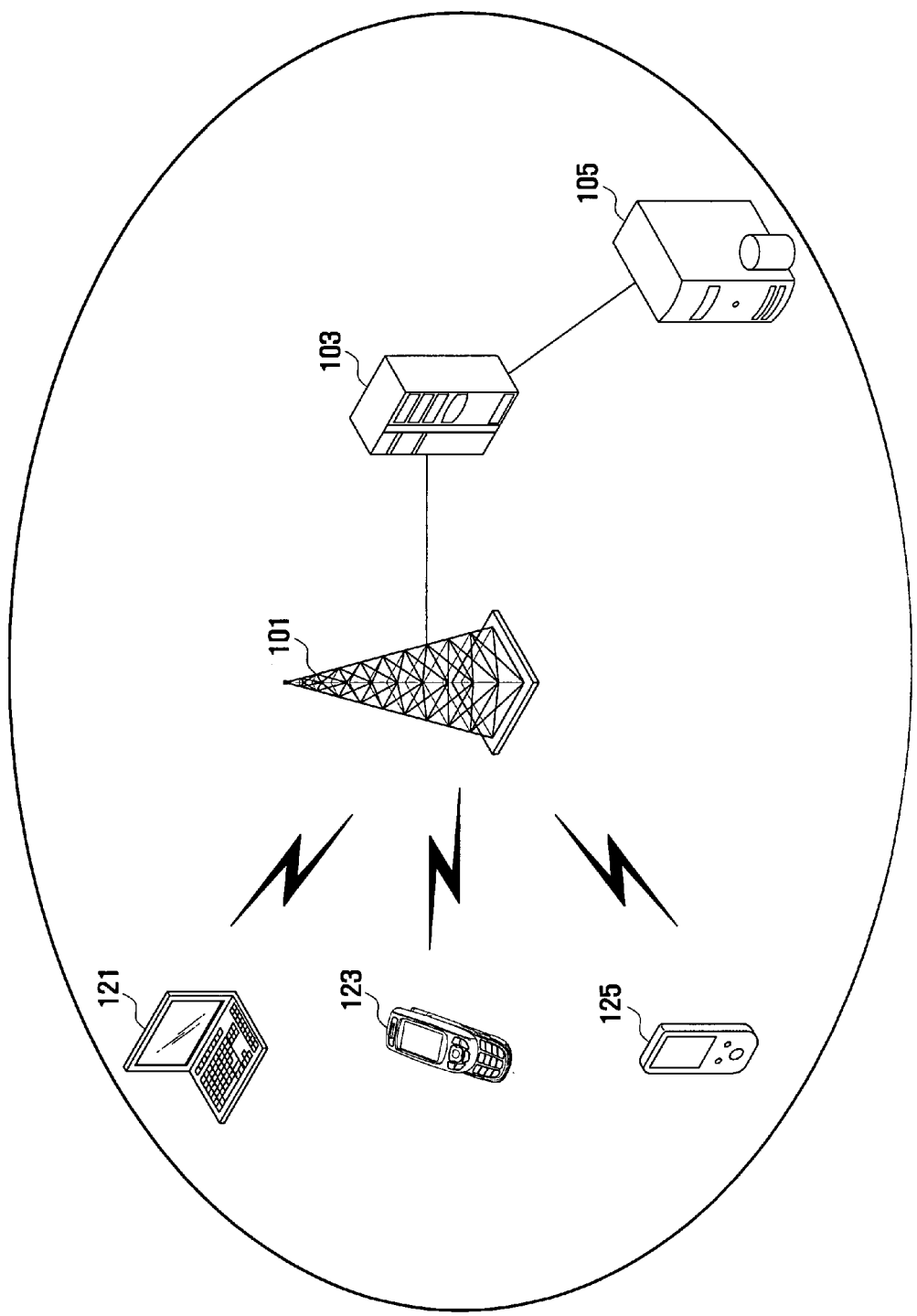
FIG. 1 illustrates a the configuration of a wireless mobile communication system according to the present invention.

As shown in FIG. 1, the wireless mobile communication system includes a Radio Access Station (RAS) 101 that forms a service area defined by intensity of transmission power to provide a network connection service to wireless communication terminals 121, 123, and 125 within the service area, an Access Control Router (ACR) 103 for routing data generated by the wireless communication terminals 121, 123, and 125 connected to a network through RAS 101 to a destination, and a Database Server 105 for collecting network related data and providing the collected data to RAS 101 or ACR 103, if necessary. The wireless communication terminals may be, for example, a mobile Internet wireless communication terminal, a notebook computer, and a smart phone that support WiBro communication and GPS communication.

Figure 2:
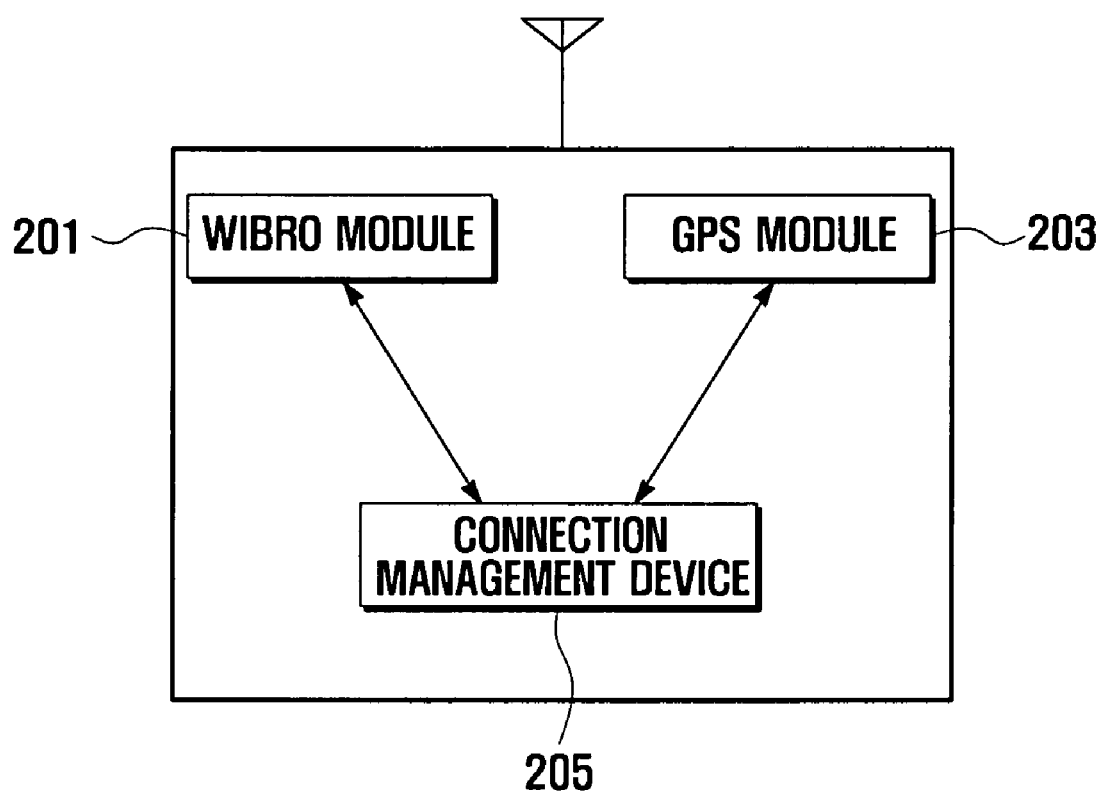
FIG. 2 illustrates a the configuration of a wireless communication terminal in a wireless mobile communication system according to the present invention.

As shown in FIG. 2, each wireless communication terminal includes a WiBro module 201, a GPS module 203, and a connection management device 205.

A WiBro service provider provides a database (DB) about the service area availability, a weak radio area, etc. Otherwise, WiBro connection management device 205 constructs a database (DB) by collecting information about a WiBro network connection state and attempts a connection using the service map DB when connecting to the network. When the service provider provides the service map DB, the wireless communication terminal periodically receives and updates the service map DB from the service provider.

Before the wireless communication terminal attempts to connect to a network so as to use a WiBro service, connection management device 205 compares current position information received through GPS module 203 with map information stored in the service map DB, determines if a current position of the terminal is within a WiBro available service area, and attempts to connect to the network through connection management device 205, if the current position is in a WiBro available service area. Otherwise, if it is determined that the current position is not in a WiBro available service area, the wireless communication terminal displays a message informing the user that the current position is in an unavailable service area. The wireless communication terminal attempts to connect to the network if a signal for a connection request is continuously re-applied by the user although the current position is in an unavailable service area.

If the wireless communication terminal moves to a weak radio area while receiving service within a service area, the wireless communication terminal, using current position information and service map DB information, informs the user that the current position is in a weak radio area.

Further, in a state where the WiBro modem of WiBro module 201 is turned off so as to prevent power consumption of the wireless communication terminal, when the user turns on the wireless communication terminal and attempts to connect to the network, connection management device 205 determines if a current position is within an available or unavailable service area using position information before turning on the WiBro modem of WiBro module 201 and then attempts to connect to the network.

Figure 3:
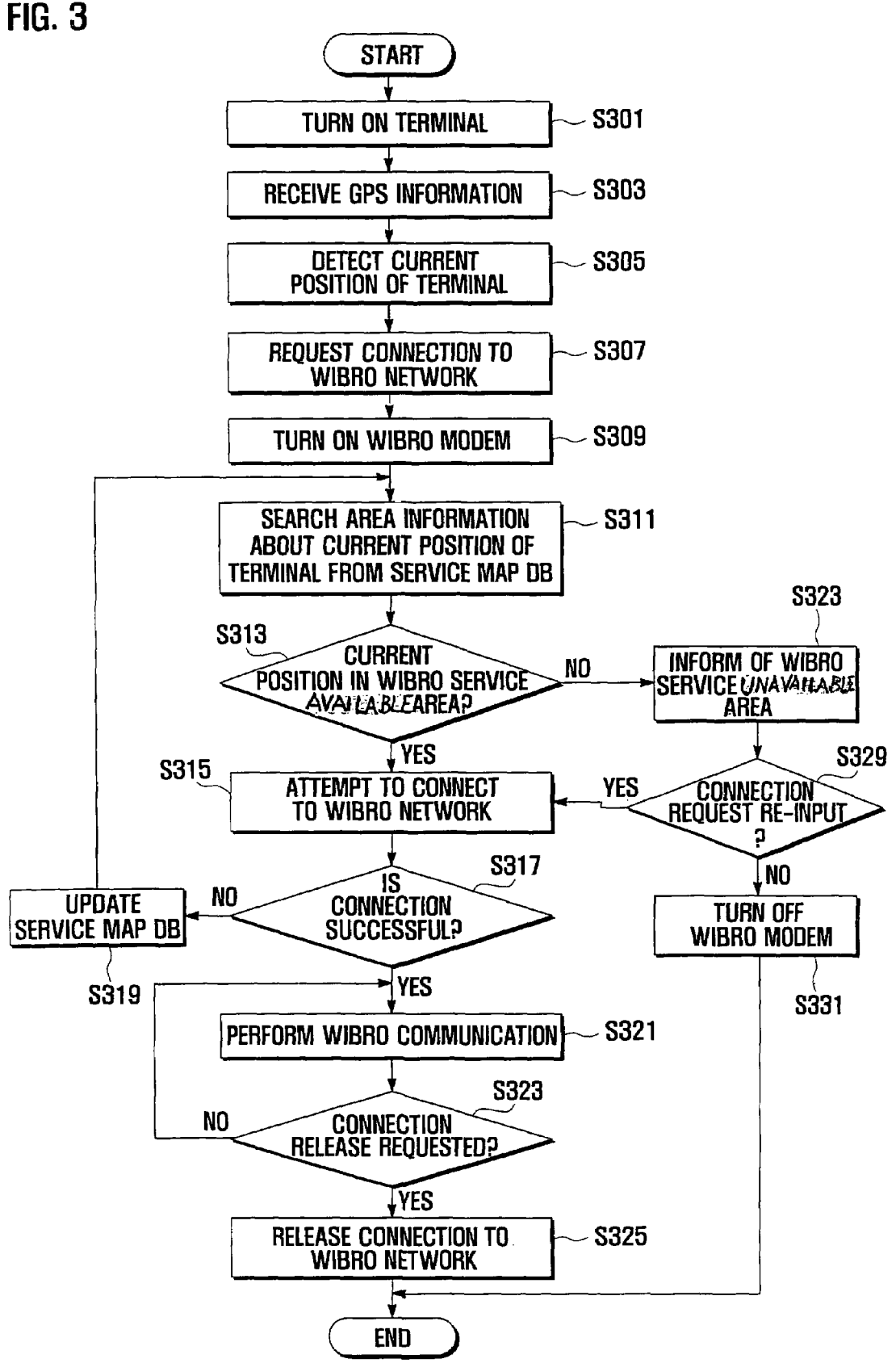
FIG. 3 is a flowchart of a wireless mobile communication method according to the present invention.

Referring to FIG. 3, in a state where the WiBro modem of WiBro module 201 is turned off, if the wireless communication terminal is turned on at step S301, the wireless communication terminal periodically receives GPS information through GPS module 203 in step S303 and detects a current position of the wireless communication terminal in step S305. When a signal for a WiBro connection request is applied by the user in step S307, the wireless communication terminal turns on the WiBro modem of WiBro module 201 in step S309, searches area information about the current position of the wireless communication terminal from a WiBro service map DB in step S311, and determines if the current position is in a WiBro service possible area in step S313.

If the current position is in an available WiBro service area, the wireless communication terminal attempts to connect to a WiBro network through connection management device 205 in step S315 and determines if the connection is successful in step S317. If the connection is unsuccessful, the wireless communication terminal updates the WiBro service map DB in step S319 and returns to step S311.

If the connection is successful at step S317, the wireless communication terminal performs WiBro communication in step S321 and determines if a signal for a connection release request is applied while performing the WiBro communication in step S323. If a signal for a connection release request is applied, the wireless communication terminal releases the connection to the WiBro network through connection management device 205 in step S325.

If it is determined that the current position is not in an available WiBro service area at step S313, the wireless communication terminal outputs a message informing the user that the current position is in an unavailable WiBro service area through the display device in step (S323) and determines if a signal for a connection request is re-applied at step S329.

If a signal for a connection request is re-applied, the wireless communication terminal performs step S315. If a signal for a connection request is not re-applied, the wireless communication terminal turns off the WiBro modem of WiBro module 201 in step S331.

Figure 4:
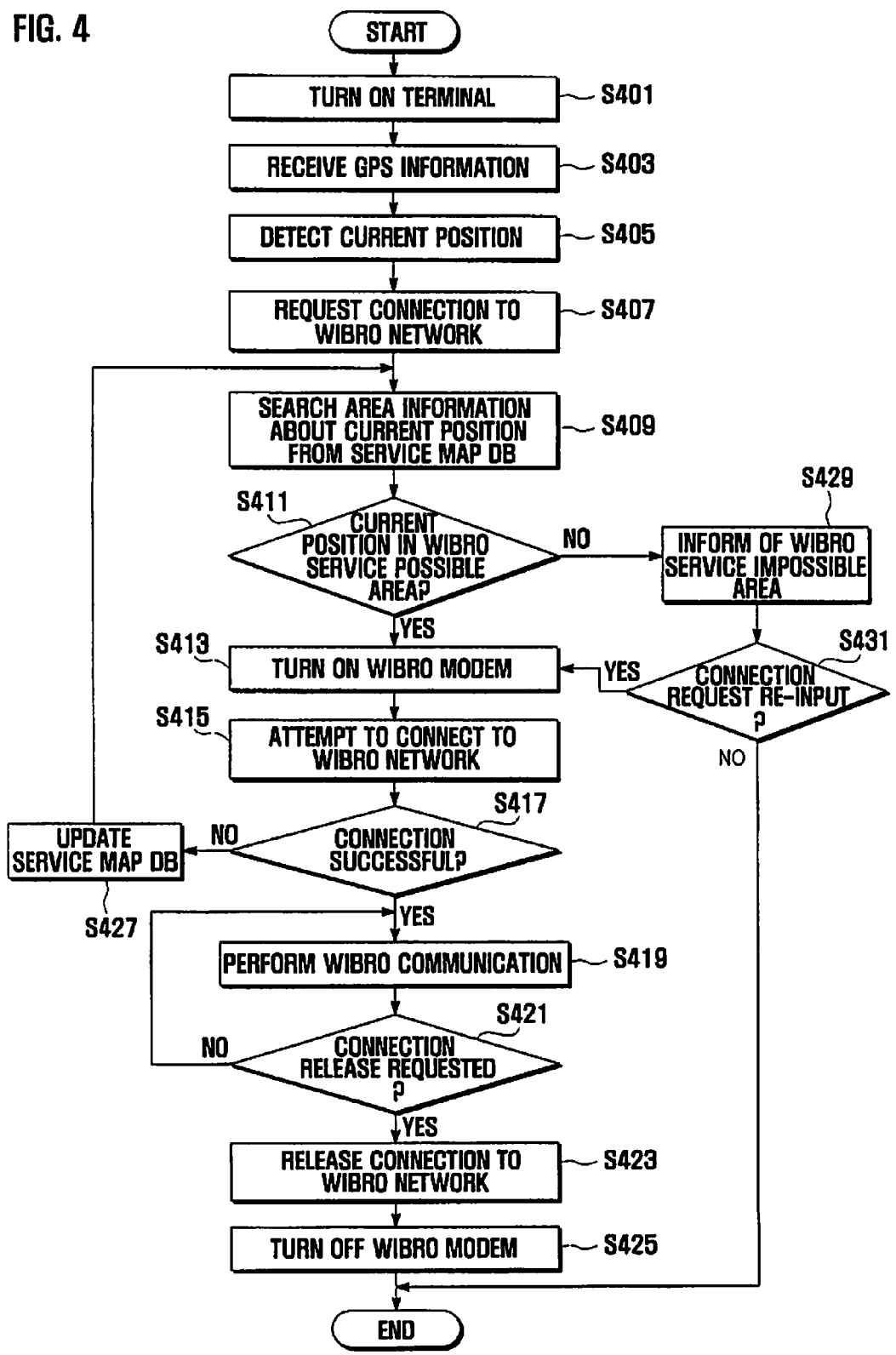
FIG. 4 is a flowchart of another wireless mobile communication method according to the present invention.

Referring to FIG. 4, in a state where the WiBro modem of the WiBro module 201 is turned off, if the wireless communication terminal is turned on in step S401, the wireless communication terminal periodically receives GPS information through GPS module 203 in step S403, detects the current position of the terminal in step S405. When a signal for a WiBro connection request is applied by the user in step S407, the wireless communication terminal searches area information about the current position thereof from a WiBro service map DB in step S409 and determines if the current position is in a WiBro available service area in step S411.

If the current position is in an available WiBro service area, the wireless communication terminal turns on the WiBro modem of WiBro module 201 if the WiBro modem is off in step S413 and attempts to connect to a WiBro network through connection management device 205 in step S415. The wireless communication terminal then determines if the connection is successful in step S417. If the connection is unsuccessful, the wireless communication terminal updates the WiBro service map DB in step S427 and returns to step 409.

If the connection is successful at step S417, the wireless communication terminal performs WiBro communication in step S419 and determines if a signal for a connection release request is applied while performing the WiBro communication in step S421. If a connection release signal is applied, the wireless communication terminal releases the connection to the WiBro network at step S423 and turns off the WiBro modem of WiBro module 201 in step S425.

If it is determined that the current position is in an unavailable WiBro service area at step S411, the wireless communication terminal outputs a message through the display device informing the user that the current position is in an unavailable WiBro service area in step S429 and determines if a signal for a connection request is re-applied at step S431.

If a signal for a connection request is re-applied, the wireless communication terminal performs step S413.

As described above the present invention provides a wireless mobile communication terminal and method that can check a service area using GPS, the wireless communication terminal can determine its current position versus the availability of WiBro service area using the GPS and WiBro service map information that have been stored in the wireless communication terminal, thereby preventing power consumption due to unnecessary connection attempt in the unavailable service area.

Further, even if the WiBro modem is turned off, because a service area availability can be predetermined, power consumption can be prevented by avoiding unnecessary connection request and the user's convenience can be enhanced.

Although preferred embodiments of the present invention have been described in detail above, it should be clearly understood that many variations and modifications of the basic inventive concepts herein taught which may appear to those skilled in the present art will still fall within the spirit and scope of the present invention, as further defined by the appended claims.

What is claimed is:

1. A wireless communication terminal using a position detection system for use in a wireless communication system having at least one connection node for providing a network connection service to a plurality of wireless communication terminals, the wireless communication terminal comprising:
   a communication module for communicating with other wireless communication terminals through the connection node;
   a position detection module for receiving position information about the wireless communication terminal;
   a network connection module, including a service map specifying a communication availability area determined according to a state of radio waves that have arrived from the connection node,
   wherein the network connection module determines if a signal for a connection request to the connection node is applied,
      if the signal for the connection request is applied, determines if a current position is in an available service area using the position information and a service map specifying a previously stored communication availability area,
      if the current position is in the available service area, turns on a communication modem and attempts to connect to a network, and
      if the current position is not in the available service area, informs that the current position is in an unavailable service area using a message, and
   wherein the service map comprises information about a position and range of the communication available area, a communication unavailable area, and a weak radio area.

2. The wireless communication terminal of claim 1, wherein terminal communicates with the other wireless terminals using an IEEE 802.16 communication standard.

3. The wireless communication terminal of claim 1, wherein the position detection system comprises a Global Positioning System (GPS).

4. The wireless communication terminal of claim 1, wherein the service map is updated based on position information received from the position detection system and a network connection attempt result.

5. A wireless communication method using a position detection system for use in a wireless communication system having at least one connection node for providing a network connection service to a plurality of wireless communication terminals, the wireless communication method comprising:
   receiving, by a wireless terminal, position information about the wireless communication terminal;
   determining if a signal for a connection request to the connection node is applied;

determining if a current position is in an available service area using the position information and a service map specifying a previously stored communication availability area, if the signal for the connection request is applied;

turning on a communication modem and attempting to connect to a network, if the current position is in the available service area; and informing that the current position is in an unavailable service area using a message, if the current position is not in the available service area;

wherein the service map comprises information about a position and range of a communication available area, a communication unavailable area, and a weak radio area.

6. The wireless mobile communication method of claim 5, wherein the position information is received through a GPS.

7. The wireless mobile communication method of claim 5, wherein attempting to connect to the network further comprises:

determining if a signal for a connection request is re-applied, after outputting the message informing that the current position is in the communication unavailable area; and turning on, if the signal for the connection request is re-applied, a communication modem and attempting to connect to a network.

8. The wireless mobile communication method of claim 7, wherein the communication modem is turned on and attempting to connect to the network is performed, when the current position is in the communication available area.

9. The wireless mobile communication method of claim 8, wherein attempting to connect to the network further comprises:

determining if the connection the network is successful;

performing, if the connection is successful, communication;

determining if a signal for a connection release request is applied while the communication is performed; and releasing, if the signal for the connection release request is applied, the connection and turning off the communication modem.

10. The wireless mobile communication method of claim 9, further comprising:

updating, if the connection is unsuccessful, the service map based on the position information and a connection failure result.

* * * * *